Geo. W. Phillips, Button.

117564          Patented Aug 1 1871

Witnesses          Inventor
M. Vorlaender          Geo. W. Phillips.
Wm. H. C. Smith.          per Munn & Co
         Attorneys

UNITED STATES PATENT OFFICE.

GEORGE W. PHILLIPS, OF FRESH POND, NEW YORK.

IMPROVEMENT IN BUTTONS.

Specification forming part of Letters Patent No. 117,564, dated August 1, 1871.

*To all whom it may concern:*

Be it known that I, GEORGE W. PHILLIPS, of Fresh Pond, in the county of Suffolk and State of New York, have invented a new and useful Improvement in Buttons; and I do hereby declare that the following is a full, clear, and exact description thereof, which will enable others skilled in the art to make and use the same, reference being had to the accompanying drawing forming part of this specification.

This invention relates to improvements in the construction of buttons for sleeves, bosoms, or other articles of wearing apparel; and it consists in a front piece, of porcelain, metal, or other substance, with a shank having one end screw-threaded and the other split for attaching to the said front piece of porcelain or other substance by driving into a hole having two opposite sides undercut for spreading and clinching the split shank the screw-threaded end of which is for attaching the disk for the back part of the completed button to it, said disk having a screw-threaded socketed shank for screwing onto it, all as hereinafter more fully described.

Figure 1:
Figure 2:
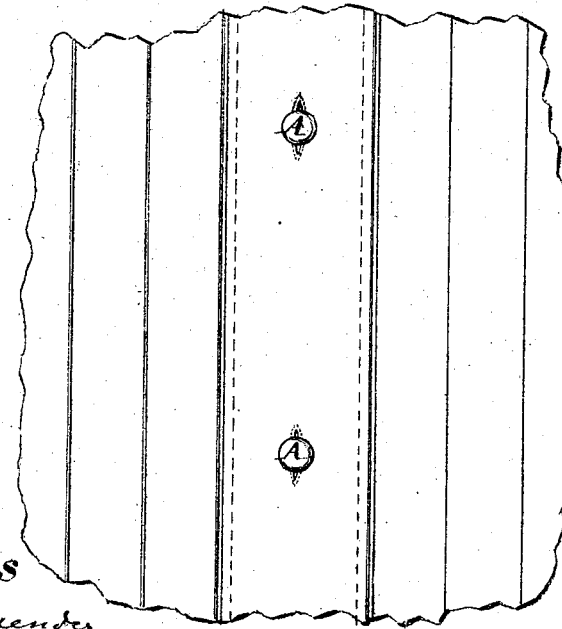

Figure 1 is a sectional elevation of my improved buttons, and Fig. 2 is a front view of a shirt-front buttoned together with my improved buttons.

A is the front piece, which may be of any approved substance. It has a hole, B, in the rear side which is under cut on two opposite sides, as shown, for securing the split end C of the screw-threaded shank D by driving it in so as to spread the two parts, as shown in Fig. 1. E is the disk for the back part of the button. It has a socketed and internally-screwed threaded shank, F, which screws on the shank D after it has been passed through the button-hole of the cloth.

Having thus described my invention, I claim as new and desire to secure by Letters Patent—

The front piece A having a recess, B, gradually enlarged toward the bottom, the shank D having diverging prongs upon its head, and the flanged nut E, all combined, constructed, and arranged, as described, to form an improved detachable button.

The above specification of my invention signed by me this 18th day of February, 1871.

GEORGE W. PHILLIPS.

Witnesses:
GEO. W. MABEE,
T. B. MOSHER.